(12) United States Patent
Fuerst

(10) Patent No.: US 11,396,148 B1
(45) Date of Patent: Jul. 26, 2022

(54) CONTACT LENS USING ELECTROSPUN POLYMERS

(71) Applicant: Randall F. Fuerst, Orangevale, CA (US)

(72) Inventor: Randall F. Fuerst, Orangevale, CA (US)

(*) Notice: Subject to any disclaimer, the term of this patent is extended or adjusted under 35 U.S.C. 154(b) by 191 days.

(21) Appl. No.: 16/813,717

(22) Filed: Mar. 9, 2020

Related U.S. Application Data

(60) Provisional application No. 62/815,722, filed on Mar. 8, 2019.

(51) Int. Cl.
| | |
|---|---|
| *G02C 7/04* | (2006.01) |
| *B29D 11/00* | (2006.01) |
| *B29C 33/42* | (2006.01) |
| *B29C 43/18* | (2006.01) |
| *B29C 43/00* | (2006.01) |
| *B29K 105/00* | (2006.01) |
| *B29K 101/00* | (2006.01) |

(52) U.S. Cl.
CPC ........ *B29D 11/00076* (2013.01); *B29C 33/42* (2013.01); *B29C 43/003* (2013.01); *B29C 43/18* (2013.01); *B29D 11/0048* (2013.01); *B29D 11/00134* (2013.01); *B29D 11/00192* (2013.01); *B29D 11/00432* (2013.01); *G02C 7/04* (2013.01); *B29K 2089/00* (2013.01); *B29K 2101/00* (2013.01); *B29K 2105/0058* (2013.01); *B29K 2715/00* (2013.01); *B29K 2901/00* (2013.01); *B29K 2909/08* (2013.01)

(58) Field of Classification Search
CPC ........ B29D 11/00076; B29D 11/00134; B29D 11/00192; B29D 11/00432; B29D 11/0048; B29C 33/42; B29C 43/18; B29C 43/003; G02C 7/04
See application file for complete search history.

(56) References Cited

U.S. PATENT DOCUMENTS

| | | |
|---|---|---|
| 7,563,396 B2 | 7/2009 | Fuerst et al. |
| 7,579,442 B2 | 8/2009 | Fuerst et al. |
| 8,361,492 B2 * | 1/2013 | Tauber ................ A61K 9/0092 424/443 |

* cited by examiner

*Primary Examiner* — Mathieu D Vargot
(74) *Attorney, Agent, or Firm* — Geneva Lai

(57) ABSTRACT

A method for making an improved contact lens with the steps of providing a mold with a space between the top surface and a bottom surface, and positioning a mat in the space of the mold, providing a bead of liquid polymer of predetermined size at a predetermined location on the surface of the mat, pressing the bead of liquid polymer into the mat between the top surface and the bottom surface of the mold to form an optical zone framed by a mat peripheral zone, exposing the optical zone and the peripheral zone with U-V radiation to harden the optical zone into a composite improved contact lens, removing the cross-linked improved contact lens from the mold, processing the peripheral zone surrounding the optical zone to have a fenestration surface having holes, the holes being through holes with predetermined diameters selected to pass larger proteins, lipids, metabolites.

10 Claims, 6 Drawing Sheets

CONTACT LENS USING ELECTROSPUN POLYMERS

This application claims the benefit of priority to U.S. provisional application having Ser. No. 62/815,722 that was filed on Mar. 8, 2019. This and all other extrinsic references referenced herein are incorporated by reference in their entirety.

This invention was made without government support.

FIELD OF THE INVENTION

This invention relates in general to refractive correction and in particular to a method and means of fabricating an improved permeable contact lens that mimics the native corneal structure.

BACKGROUND

This Invention relates to the field of contact lens manufacturing, the structure of contact lens products and to the method of making contact lenses. The field of the invention is more particularly related to the field of Electrospinning polymer and collagen material used for making a contact lens.

As background, it should be known that U.S. Pat. No. 7,563,396 issued on Jul. 24, 2009 for FABRICATION OF IMPROVED CONTACT LENS UTILIZING POLYMER ELECTROSPINNING from application Ser. No. 10,735,451 filed on Dec. 12, 2003 has a common inventor R. Fuerst. Other co-inventors on the 396 patent reference on the 396 reference include but include Joseph Bango, John Fenn and Michael Dziekan. U.S. Pat. No. 11,386,543 issued on Mar. 22, 2006 and has common co-inventors with U.S. Pat. No. 7,563,396.

As background and of historical interest, it should be known that when used, a contact lens rests in the tear film over the avascular cornea. Initial contact lenses did not perfuse oxygen, thus limiting successful lens wear. A subsequent generation of lenses were called gas permeable (GP), and then soft lenses came about in 1971. Soft lenses have angstrom diameter pore size that allow oxygen to profuse. However, larger proteins, lipids, metabolites, and mucins remain trapped underneath the lens and are stopped from reaching the corneal surface.

While significant advances have been achieved in the field of contact lens, design and fabrication, several problems still exist. Of these, paramount of which is the fact that the polymers utilized are created as a solid or at best, as semi permeable solid structures. These structures reduce the available oxygen to the corneal surface, minimize tear and aqueous transport through the lens, and act as a nucleation point for protein buildup.

SUMMARY OF INVENTION

It is a first object of this invention to provide an improved contact lens that solves the problem of larger proteins, lipids, metabolites, and mucins that develop and that are trapped in and under the tear film over the avascular cornea. The improved contact lens uses a mat of Electrospun polymer or collagen that form a landing zone or boundary ring that hold and align an optically clear polymer lens with an optical zone over the wearer's eye. The landing zone of the Electrospun mat that forms the peripheral ring outside of the optical zone is then fenestrated with holes using a laser process that makes the holes large enough to sizes the holes that permit passage of larger proteins, lipids, metabolites, and mucins that readily perfuse tear film components without substantially interfering with oxygen perfusion.

It is another object of the invention to provide an optically clear lens of polymer that is pressed into the mat of Electrospun fiber to form a hole free or fenestration free optical zone. The material and pressures used to form the lens are selected to provide perfusion of oxygen through the lens. Oxygen permeability is a desired feature as the cornea is an avascular membrane that receives its oxygen supply directly through the air. Any impediment that obstructs the corneal surface with direct contact with the surrounding air would be detrimental.

The disclosed invention allows for situations that would enable the manufacture of a contact lens that will have a high oxygen permeability in a mat of Electrospun polymer or collagen that formed as a ring around a central optical zone occupied by a clear polymer lens of diminished diameter. The Electrospun mat is formed using the process outlined in U.S. Pat. No. 7,563,396 referenced above and incorporated herein by reference in its entirety.

The mat formed from Electrospun polymer or collagen material that forms the circular boundary around a circular optical zone provides the option of allowing either a lipid impermeable or lipid permeable functionality. This functionality will be provided in the ring shaped path boundary around the edges of the central optical or lens zone. Additionally, it is common for a contact lens to be constructed as completely homogenous or with a homogenous outer surface enclosing a hydrogel or polymeric interior, which means that the lens outer covering material is consistent throughout its structure.

With the disclosed invention, it may be possible to create a mat ring of Electrospun polymer fiber that forms a path that surrounds the optic zone contact lens structure that is made out of varying layers of differing polymer materials, with the possibility of inter-dispersement of trapped drug layers to maintain a localized point of contact with the desired drug or medication and the corneal surface. The degree of surface hydrophobicity and hydrophilicity could be engineered into the surface, along with the ability to restrain lipid transport into the lens structure from degrading optical clarity.

The disclosed invention is expected to allow for situations that would enable the manufacture of a contact lens that would will have a high oxygen permeability, while allowing the option of having either lipid impermeable or lipid permeable functionality. This functionality is of importance in designing a therapeutic contact lens, in addition to a refractive contact lens. In either case, one would want a high degree of oxygen permeability in the ring path that forms a circle around the central lens or optic zone. The following description includes information that may be useful in understanding the present invention. It is not an admission that any of the information provided herein is prior art or relevant to the presently claimed invention, or that any publication specifically or implicitly referenced is prior art

DETAILED DESCRIPTION

Figure 1:
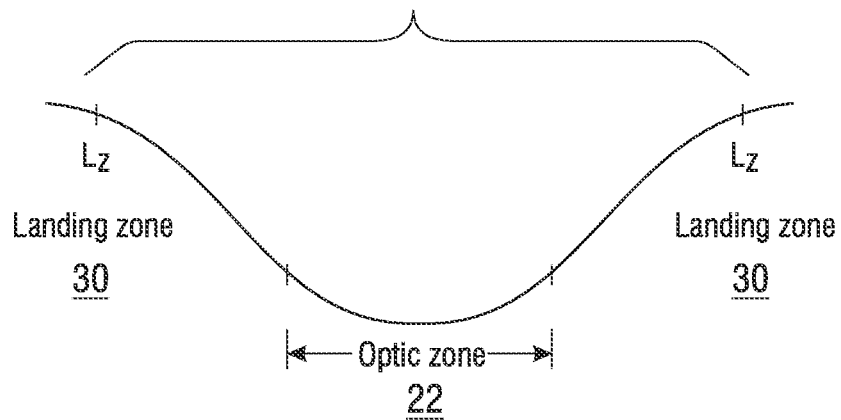
FIG. 1 is a schematic view of the sectioned shape of a contact lens.

1. Referring now to the Figures, an improved contact lens using Electrospun polymer or collagen can be made using the following steps. The first step is providing a mold having a bottom surface and a top surface, with a space between the top surface and a bottom surface. FIG. 1 shows a schematic version of a sectional view of the contact lens to be made.

Figure 3:
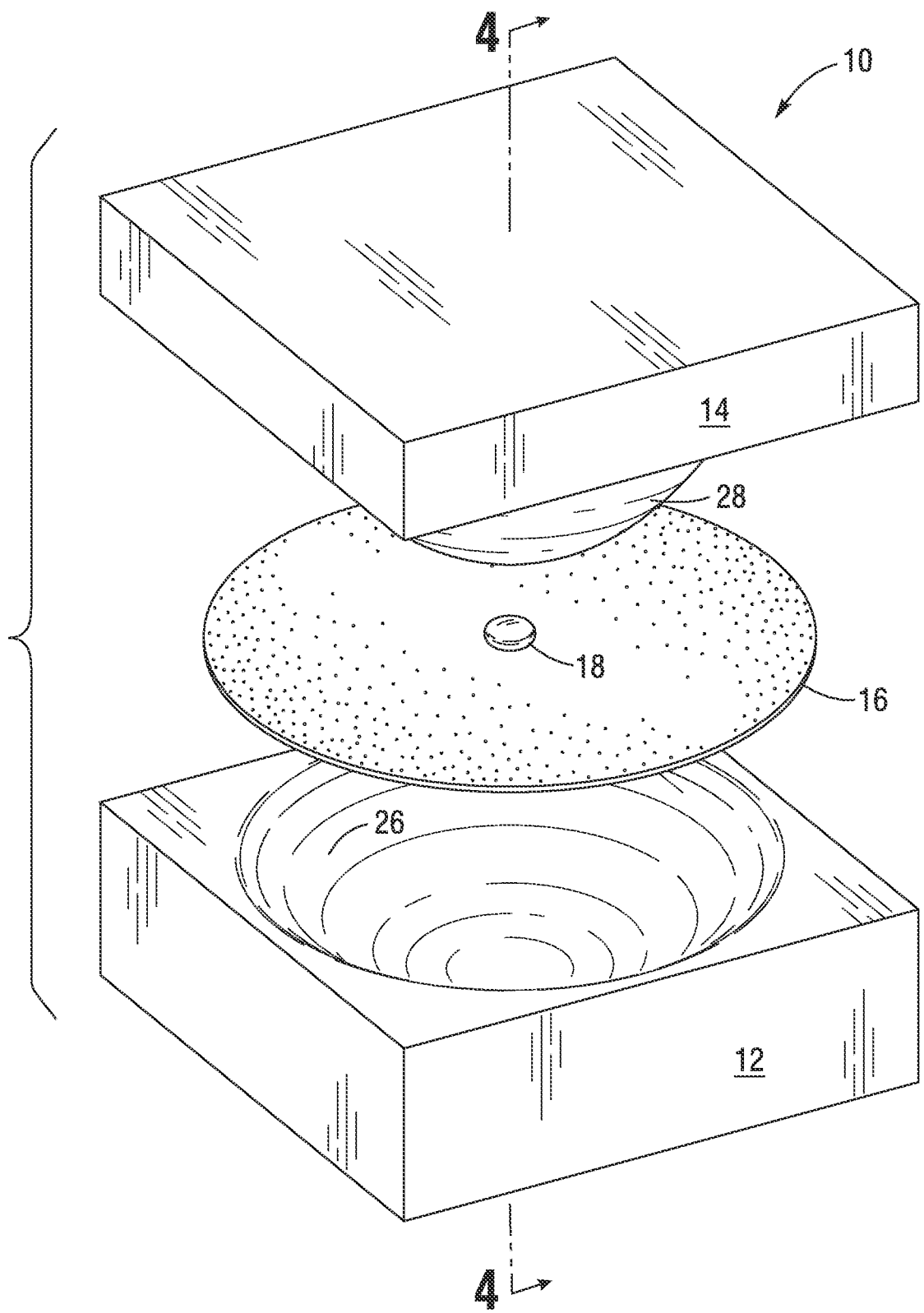
FIG. 3 is a schematic perspective view of the mold having a bottom and top portion, a mat positioned between the mold bottom and top portion and a drop of liquid polymer, for the later formation of a lens at the optical zone, positioned on the mat, FIG. 4 sectional view of the mold shown in FIG. 3 taken on section line 4-4 in FIG. 3.

FIG. 3 shows a is a schematic perspective view of the mold 10 having a bottom portion 12 and top portion 14. A mat 16 is positioned between the mold bottom and top portion and a drop of liquid polymer 18 (e.g., optically clear polymer), for the later formation of a lens 20 at the optical zone 22, is positioned on the mat 16. The mat is positioned in the space between the mold bottom surface 26 and the mold top surface 28. The drop of liquid polymer 18 of predetermined size is positioned on the mat at the predetermined location on the surface of the mat. In another embodiment, the liquid drop of predetermined size may comprise collagen. In yet another embodiment, the material (e.g., polymer, collagen) for the drop may be selected to match the material of the mat (e.g., polymer, collagen)

Figure 5:
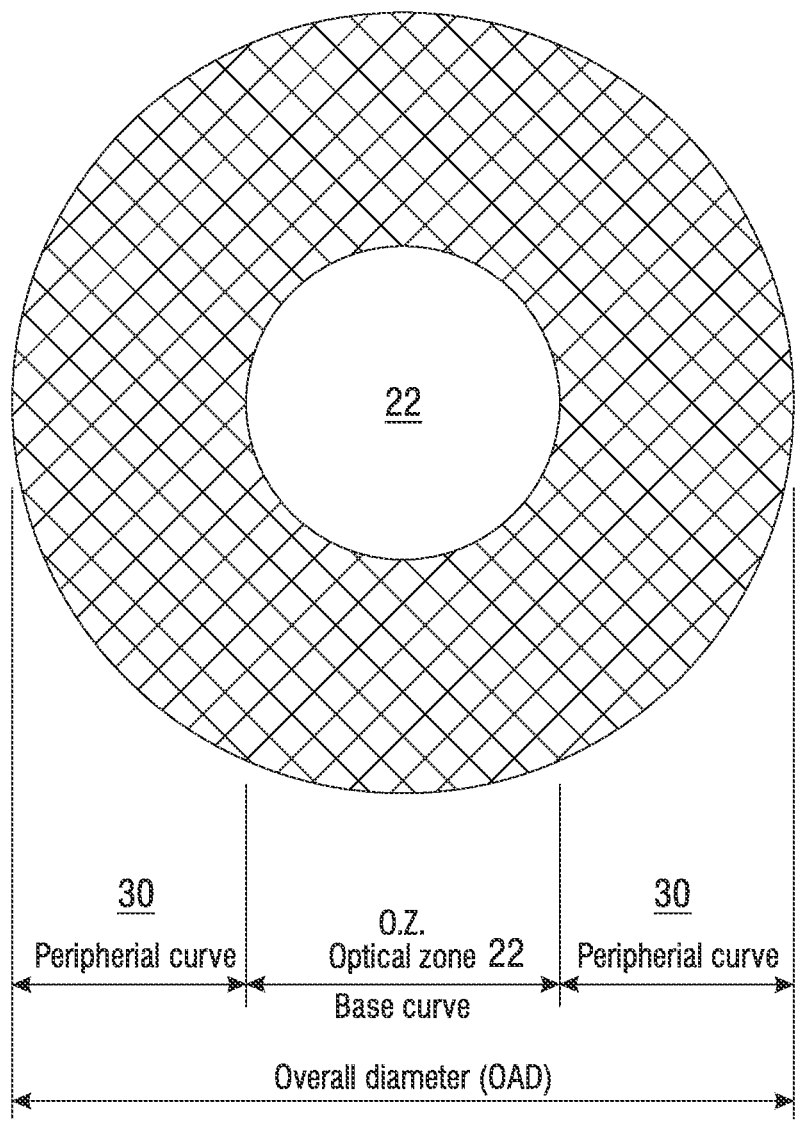
FIG. 5 is a schematic plan view of the mat after the mat is pressed between the bottom and top and bottom of the mold, the optical zone formed from the drop of liquid polymer is shown at the center of the mat with the hatched peripheral region forming a border around the optical zone.
Figure 6:
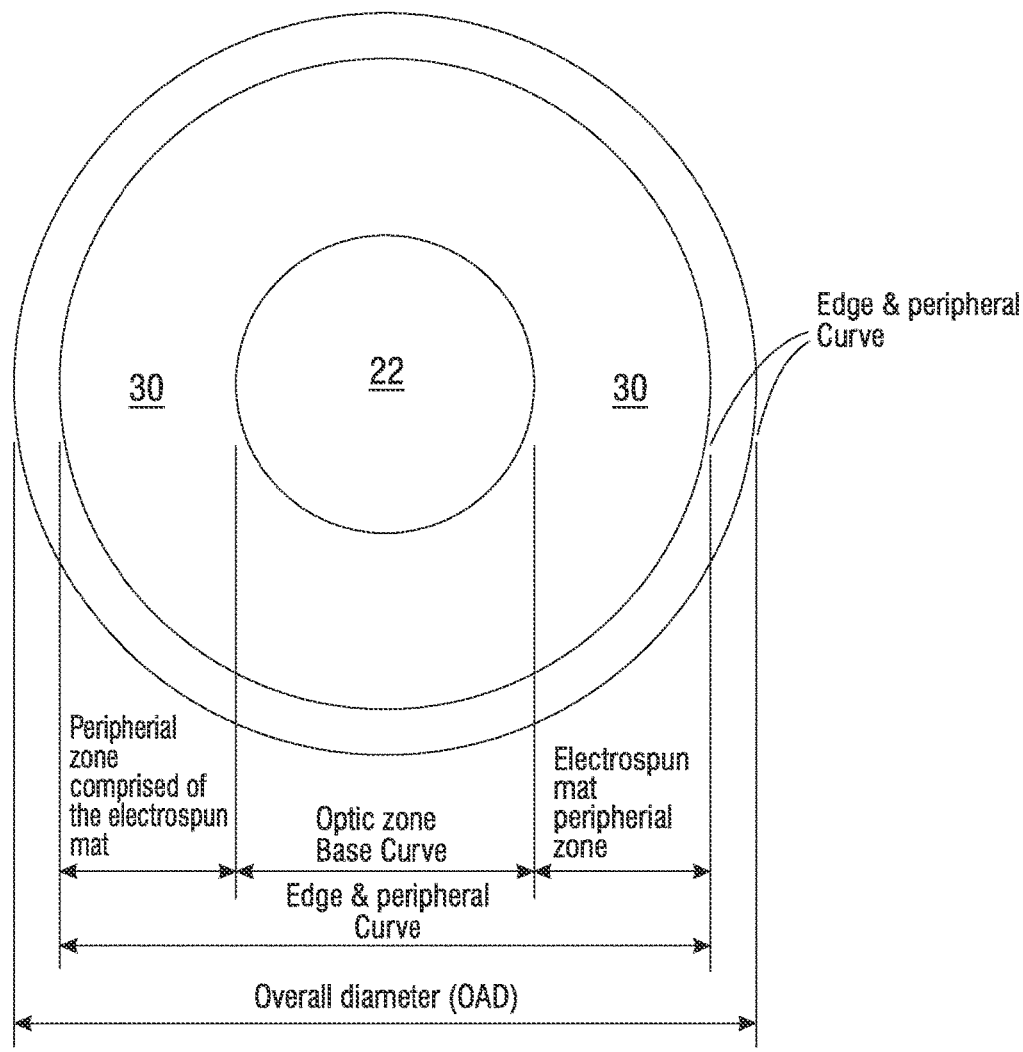
FIG. 6 is a schematic plan view of the mat showing the optical zone the Electrospun peripheral zone, and the edge and peripheral zone.
Figure 7:
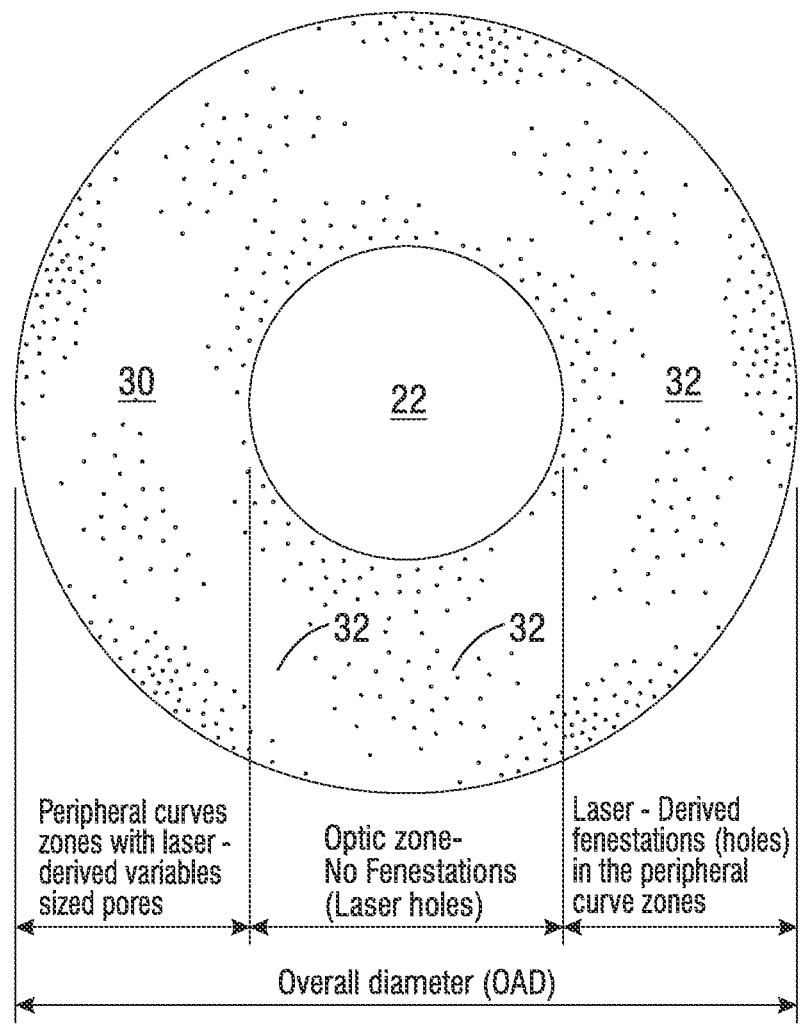
FIG. 7 is a schematic plan view of the mat of Electrospun polymer or collagen fiber showing regions of the Electrospun fiber mat with an optical zone located at its center and with fenestrations in the mat regions beyond the hole free optic zone.

The mold is then closed (not shown) with sufficient force to press the bead of liquid polymer into the mat between the bottom surface 26 and the top surface 28 of the mold to form the optical zone 22 shown in FIGS. 1, 2, 5, 6 and 7 framed by a mat peripheral zone 30 shown in FIGS. 5, 6 and 7.

After the mold is closed, and pressure, time and temperature requirements are met, which are determined empirically, the final step in making the contact lens is to cross link the formed and pressed polymer (collagen) with the mat while in the mold. The optical zone and the peripheral zone in the mold are exposed to U.V. radiation or by other chemical means known to users of polymer products.

Exposing the optical zone and the peripheral zone of the mat with UV radiation to harden the optical zone into a composite improved contact lens. The contact lens is then removed from the mold and a laser is used to drill through-holes through the peripheral zone 30 to produce fenestration holes 32 as shown in FIG. 7.

Figure 4:
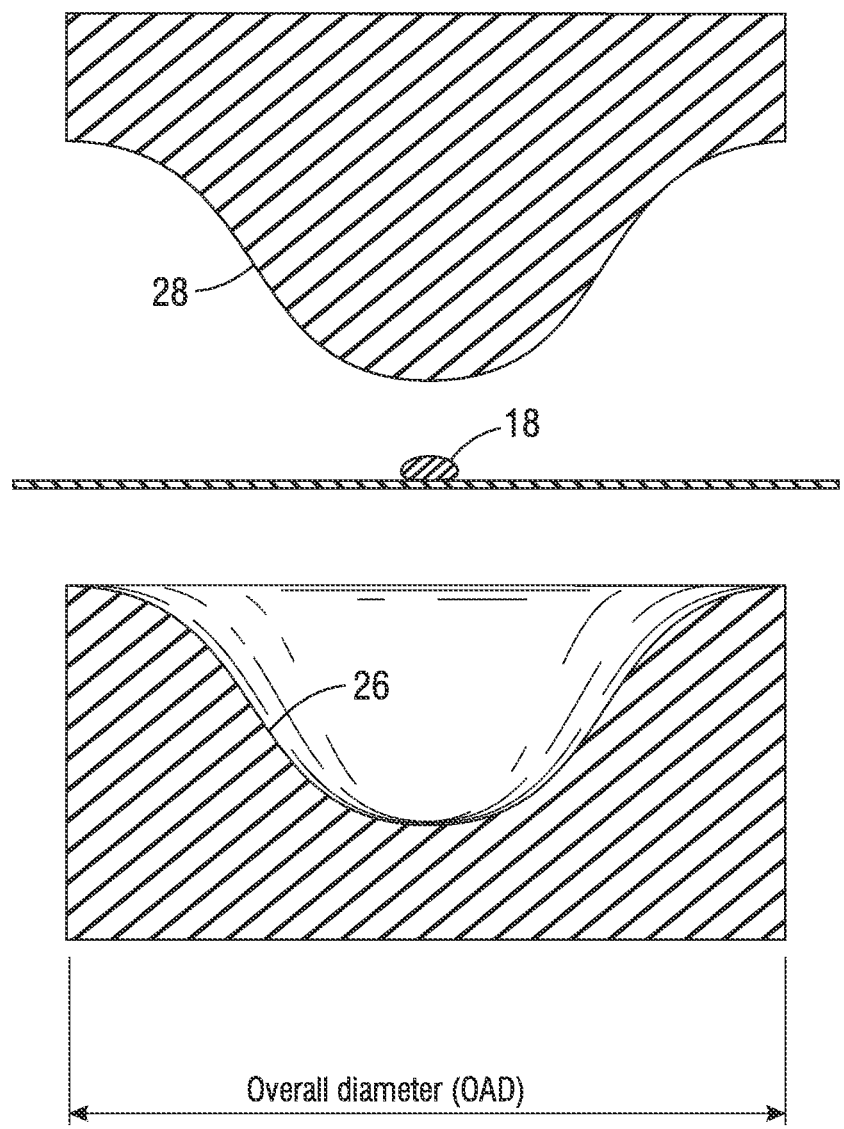

The method for making and the product requires that the bottom mold have a concave receiving surface and the top mold have a convex driving section, as shown in FIG. 3 and FIG. 4 with a periphery defining the edges of the mat to be formed, and the top portion having a convex surface with a periphery defining the edges of the mat to be formed.

The use of the mold of FIG. 3 and FIG. 4 in making an improved contact lens using Electrospun polymers requires a means for registering or aligning the top portion of the mold above the bottom portion of the mold with the mat there between as the top portion is pressed onto the bottom portion. The registration is not shown but will be required if the mold is to provide prescriptive features formed in the bottom surface with those in the top surfaces of the lens to be made, as the top portion of the mold is coupled to the bottom portion of the mold with the mat there between.

It should be understood that the mold is typically made of glass or plastic. The mold must be able to transmit U-V light through its walls. Molds are typically machined using data from a data base and are typically only used a few times before being replaced. Most molds that are made are used to produce contact lenses that do not have aspherical corrections. The surfaces of such molds are typically spherical and that makes them easily manufactured.

Figure 2:
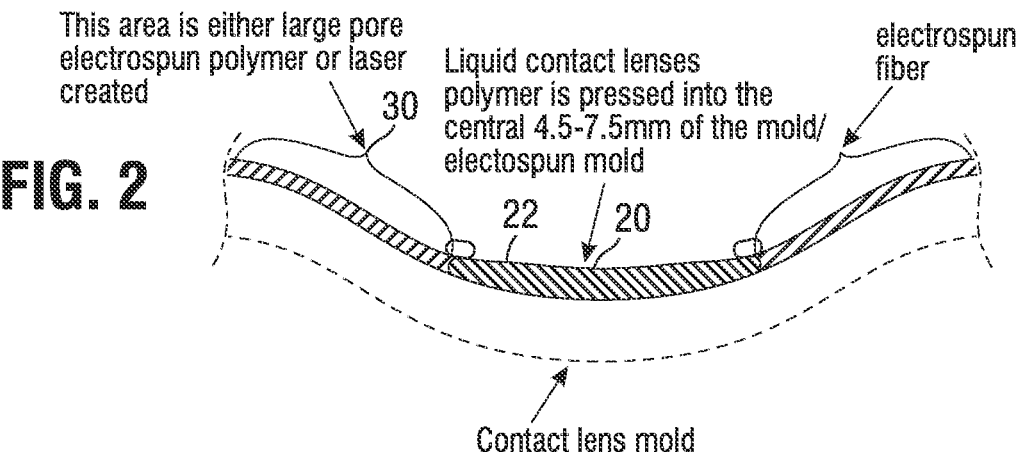
FIG. 2 is an exaggerated schematic sectional or edge view of the general shape of a concave mold used to form a contact lens that schematically depicts an outer ring region of the concave mold that is used to form a landing zone or ring paths and the central lens or optic zone.

The improved contact lens using Electrospun polymers is schematically shown in FIG. 7 where region 30 represents the peripheral region that surrounds the optical zone 22. The optical zone 22 is formed from the drop of polymer (or collagen) 18 shown in FIG. 3. After the drop of polymer (or collagen) is forced into the mat 16 it defines the optical zone 22 shown schematically in FIG. 2. The optical zone is void free except for the properties of the polymer (or collagen) that is used to form the lens 20. As the bottom and top of the mold drive the drop of polymer (or collagen) 18 that is used to form a void free impregnated quasi circular optical zone, as shown in FIG. 2, at the center of the mat. A portion of the optical zone 22 forms the lens schematically shown as 20 in FIG. 2. The void free region is formed in response to the mat being pressed between a top surface and a bottom surface of a mold with sufficient force to drive the clear polymer (or collagen) into the mat 16 to form a quasicircular void free optical zone 22. It should be understood that the top and bottom surface of the optical zone is flush with the peripheral zone surrounding the optical zone The resulting improved contact lens using Electrospun polymer or collagen fiber prior to the process of fenestration, is a mat with a quasicircular or near circular void free optical zone, surrounded with the peripheral zone, the optical zone being hardened and cross linked with UV light.

In an embodiment, the processed cross linked but incomplete contact lens of FIG. 5 and FIG. 6 is then fenestrated to have laser holes drilled though the peripheral regions 30 to produce the improved contact lens of FIG. 7 where the fenestration holes are represented by various reference numbers 32 and the peripheral zone 30 represents a fenestration surface showing holes 32. The holes are designed to have diameters selected to pass larger proteins, lipids, metabolites, and mucins that would otherwise remain trapped underneath the lens and would be stopped from reaching the corneal surface. In another alternative embodiment, the improved contact lens using Electrospun polymer's peripheral zone surrounding the optical zone is laser processed to position the holes along circular paths within the peripheral zone, the holes being located on unsynchronous or random ring paths forming a circular raster. In yet another embodiment, the holes may be positioned along a spiral path within the peripheral zone, the holes being randomly spaced along the spiral path.

It should be understood that in some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

It should be apparent to those skilled in the art that many more modifications besides those already described are possible without departing from the inventive concepts herein. The inventive subject matter, therefore, is not to be restricted except in the scope of the appended claims.

APPENDIX

List all reference numbers and the term or name associated with that reference number for consistency through out the specification and the claims.
- 10 mold
- 12 bottom portion
- 14 top portion
- 16 mat (formed from Electrospun polymer or collagen)
- 18 drop of liquid polymer (the lens)
- 20 lens
- 22 Optical Zone
- 24
- 26 mold bottom surface
- 28 mold top surface
- 30 peripheral zone
- 32 fenestations (holes)

What is claimed is:

1. A method for making a contact lens using electrospun fibers comprising:
    providing a mold having a bottom surface and a top surface, with a space between the top surface and a bottom surface,
    providing a mat of electrospun fiber polymer or collagen and positioning the mat in the space between the top surface and the bottom surface,
    positioning the mat between the bottom surface and the top surface of the mold,
    providing a bead of liquid polymer of predetermined size at a predetermined location on the surface of the mat,
    pressing the bead of liquid polymer into the mat between the top surface and the bottom surface of the mold to form an optical zone framed by a mat peripheral zone,
    exposing the optical zone and the peripheral zone of the mat with UV radiation to harden the optical zone into a composite contact lens,
    removing the composite contact lens from the mold,
    processing the peripheral zone surrounding the optical zone to have a fenestration surface having holes at predetermined regions, the holes being through-holes with predetermined diameters selected to pass proteins, lipids, metabolites, and mucins which without the holes would remain trapped underneath the contact lens and would be stopped from reaching a corneal surface.

2. The method for making a contact lens using electrospun fibers of claim 1 wherein providing the mold further comprises the step of forming the mold to have a bottom portion and a top portion, the bottom portion being formed to have a concave receiving surface with a periphery defining the edges of the mat to be formed, and the top portion having a convex surface with a periphery defining the edges of the mat to be formed.

3. The method for making a contact lens using electrospun fibers of claim 2 wherein the mold is made with a step that further comprises a means for registering the top portion above the bottom portion with the mat there between as the top portion is pressed onto the bottom portion, the registration providing for alignment of prescriptive features formed in the bottom surface with those in the top surface, as the top portion is coupled to the bottom portion with the mat there between.

4. The method for making a contact lens using electrospun fibers of claim 1 further including the step of depositing a small predetermined liquid drop of optically clear polymer or collagen onto the mat in the space between the top surface and the bottom surface of the mold.

5. The method for making a contact lens using electrospun fibers of claim 4 further including the step of selecting the material for the mold from the group comprising glass or plastic.

6. The method for making a contact lens using electrospun fibers of claim 4 wherein the step of depositing the small predetermined liquid drop of optically clear polymer or collagen includes the step of matching the material for the mat and the material for the drop of optically clear polymer or collagen from the group including optically clear polymer or collagen.

7. A contact lens using electrospun fibers comprising:
    a mat formed from electrospun polymer or collagen having an optical zone and a peripheral zone, the optical zone being formed by depositing a predetermined amount of optically clear polymer at the center of the mat, the amount of polymer being measured to form a void free impregnated substantially circular optical zone at the center of the mat in response to the mat being pressed between a top surface and a bottom surface of a mold with sufficient force to drive the clear polymer into the mat to form the void free impregnated substantially circular optical zone, the top and bottom surface of the optical zone being flush with the peripheral zone surrounding the optical zone, the mat with the void free impregnated substantially circular optical zone surrounded with the peripheral zone being hardened and cross linked with UV light.

8. The contact lens using electrospun fibers of claim 7 wherein the peripheral zone surrounding the optical zone is processed to have a fenestration surface having holes at predetermined regions, the holes being through-holes with predetermined diameters selected to pass lipids, metabolites, and mucins which without the holes would remain trapped underneath the contact lens and would be stopped from reaching a corneal surface or a tear film surface.

9. The contact lens using electrospun fibers of claim 8 wherein the peripheral zone surrounding the optical zone is laser processed to position the holes along circular paths within the peripheral zone, the holes being located on un-synchronous or random ring paths forming a circular raster.

10. The contact lens using electrospun fibers of claim 8 wherein the peripheral zone surrounding the optical zone is laser processed to position the holes along a spiral path within the peripheral zone, the holes being randomly spaced along the spiral path.

\* \* \* \* \*